United States Patent Office.

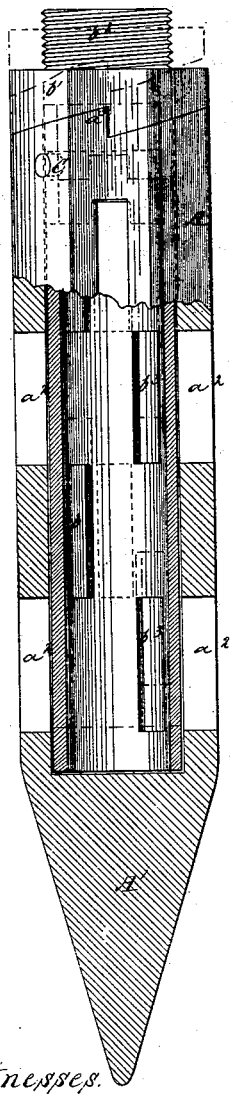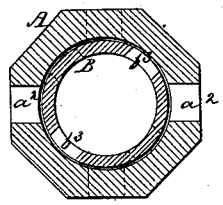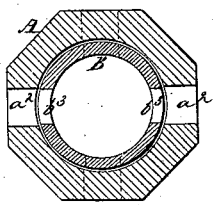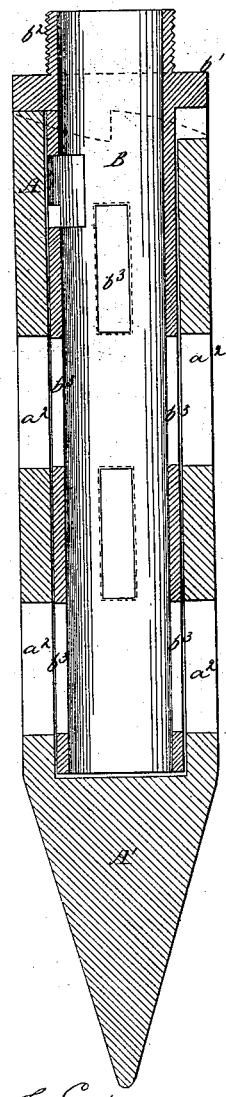

ANDREW J. EDGETT, OF HORNELLSVILLE, NEW YORK, ASSIGNOR TO HIMSELF, JOHN W. FERRY, AND ALONZO GRAVES, OF SAME PLACE.

*Letters Patent No. 61,726, dated February 5, 1867.*

IMPROVEMENT IN WELL-TUBING.

*The Schedule referred to in these Letters Patent and making part of the same.*

TO ALL WHOM IT MAY CONCERN:

Be it known that I, ANDREW J. EDGETT, of Hornellsville, Steuben county, and State of New York, (assignor to myself and John W. Ferry,) have invented new and useful improvements in Tube-Wells; and I do hereby declare that the following is a full and exact description thereof, reference being had to the accompanying drawings, making a part of this specification, in which—

Figure 1 is a sectional elevation of my improvements.
Figure 2 is a transverse section thereof.
Figure 3 is a vertical section of the same; and
Figure 4 is a transverse section of fig. 3.

The nature of this invention relates to an improvement in tube wells, and consists in making the driving point in two parts, one within the other, each part having openings so arranged that while the tube is being driven into the ground, the said openings will be closed, and after the tube has been driven to its proper depth the inner part connecting with the tube may be turned, so as to bring its openings opposite and in line with the apertures in the outer part, and thereby allow the water to enter the tube.

Letters of like name and kind refer to like parts in each of the figures.

A represents the outer part or covering which terminates in the driving point A' at its lower end, and is open at the top to receive the inner part. B represents the inner part or tube which extends above the top of the part A, and is provided with a shoulder or clutch, $b^1$, which meshes with a similar formation on the part A, as shown, and screw-shank $b^2$, to which the well tube is connected. The covering part A has a number of oblong slots, $a^2$, which are made to be placed in line with corresponding openings made in the inner tube B, as shown at $b^3$. The arrangement of the openings $a^2$ and $b^3$ is such that when the inner tube B is in the position shown in figs. 1 and 2, the openings are closed, and in that position these parts are driven into the ground. When the tube is driven to the proper depth, the tube B (the well-tube being screwed into this part) is first lifted so as to unclutch it with the part A, and then turned one-quarter revolution until the openings of the part A are opposite the openings in the inner tube B, and then lowered and clutched, thus forming passages for the entrance of the water into the well-tube and pump barrel. This position is represented in figs. 3 and 4. The shoulder $b^1$ of the inner tube B has four clutch teeth formed upon its under side, which fit into corresponding teeth or notches made upon the top of the part A, as shown at $a^3$; by this means the well-tube is prevented from turning while being driven into the ground. In order to turn the part B one-quarter revolution, it therefore becomes necessary to first raise it slightly so as to unclutch it from the part A. A guide-pin, C, projecting inside of the shell into appropriate slots cut in the inner tube B, serves to guide the tube when it is raised and turned within the part A. It also prevents the tube B from being drawn altogether out of the part A, and forms a proper connection of the two parts. This improvement is particularly well adapted for tube wells, inasmuch as it prevents any sand or gravel from entering the tube while it is being driven into the ground.

My improvement may be attached to any driving pipe now in common use, and while the tube is driven into the ground no sand or gravel will enter the barrel during the operation. After the required depth has been reached the pump barrel is slightly lifted and turned one-quarter revolution to the right, and the water will enter the barrel through the openings $a^2$ and $b^3$, as before described.

What I claim as my invention, and desire to secure by Letters Patent, is—

A driving-point for tube wells, composed of two parts, A and B, having openings $a^2$ and $b^3$, screw-shank $b^2$, and each having a clutch formation, $b^1$, all arranged and operating in the manner substantially as herein described.

ANDREW J. EDGETT.

Witnesses:
B. H. MUEHLE,
E. B. FORBUSH.